(12) United States Patent
Fu (10) Patent No.: US 12,471,146 B2
(45) Date of Patent: Nov. 11, 2025

(54) DATA TRANSMISSION METHOD, NETWORK DEVICE AND TERMINAL DEVICE

(71) Applicant: GUANGDONG OPPO MOBILE TELECOMMUNICATIONS CORP., LTD., Guangdong (CN)

(72) Inventor: Zhe Fu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 205 days.

(21) Appl. No.: 18/147,670

(22) Filed: Dec. 28, 2022

(65) Prior Publication Data

US 2023/0138379 A1    May 4, 2023

Related U.S. Application Data

(63) Continuation of application No. PCT/CN2020/112141, filed on Aug. 28, 2020.

(51) Int. Cl.
*H04W 74/0816*    (2024.01)
*H04L 1/1812*     (2023.01)
*H04W 74/08*      (2009.01)

(52) U.S. Cl.
CPC ....... *H04W 74/0816* (2013.01); *H04L 1/1812* (2013.01); *H04W 74/0866* (2013.01)

(58) Field of Classification Search
CPC ......... H04W 74/0816; H04W 74/0866; H04W 80/02; H04W 72/23; H04W 72/535; H04W 28/06; H04W 80/06; H04W 72/232; H04W 72/231; H04L 1/1812; H04L 1/1822; H04L 1/1887; H04L 1/189; H04L 1/1864; H04L 1/08; H04L 1/1858; H04J 11/0079

USPC ......................................................... 370/329
See application file for complete search history.

(56) References Cited

U.S. PATENT DOCUMENTS

| | | |
|---|---|---|
| 10,334,598 B2 | 6/2019 | Loehr |
| 10,623,988 B2 | 4/2020 | Wang |
| 10,736,107 B2 | 8/2020 | Loehr |
| 2018/0234997 A1 | 8/2018 | Hosseini |

(Continued)

FOREIGN PATENT DOCUMENTS

| | | |
|---|---|---|
| CN | 102356563 A | 2/2012 |
| CN | 109314969 A | 2/2019 |

(Continued)

OTHER PUBLICATIONS

Hearing Notice of the Indian application No. 202227076292, issued on Apr. 25, 2024. 3 pages with English translation.
First Office Action of the Chinese application No. 202310222140.2, issued on Jul. 15, 2024. 25 pages with English translation.
First Office Action of the Japanese application No. 2023-501264, issued on Jul. 23, 2024. 17 pages with English translation.
Second Office Action of the Chinese application No. 202310222140.2, issued on Sep. 26, 2024. 8 pages with English translation.

(Continued)

*Primary Examiner* — Rownak Islam
(74) *Attorney, Agent, or Firm* — PERKINS COIE LLP (57) ABSTRACT

The present application relates to a data transmission method, a network device and a terminal device. Said method comprises: a network device sending instruction information to a terminal device, the instruction information including data transmission configuration information and validity period information, and the instruction information being used for instructing the terminal device to perform data transmission within a validity period according to the data transmission configuration information.

18 Claims, 5 Drawing Sheets

S101

The network device sends indication information to a terminal device, the indication information includes data transmission configuration information and validity period information, and the indication information is used for instructing the terminal device to perform data transmission within a validity period according to the data transmission configuration information (56) References Cited

U.S. PATENT DOCUMENTS

| | | |
|---|---|---|
| 2018/0279169 A1 | 9/2018 | Wang et al. |
| 2018/0310308 A1 | 10/2018 | Loehr et al. |
| 2018/0332501 A1 | 11/2018 | Tseng |
| 2019/0274143 A1 | 9/2019 | Loehr et al. |
| 2019/0327641 A1 | 10/2019 | Mok |
| 2020/0260423 A1 | 8/2020 | Ma et al. |
| 2020/0274654 A1 | 8/2020 | Loehr et al. |
| 2020/0305026 A1 | 9/2020 | Pang et al. |
| 2020/0305178 A1 | 9/2020 | Hosseini |
| 2020/0367246 A1 | 11/2020 | Loehr et al. |
| 2021/0168650 A1 | 6/2021 | Mok |
| 2021/0385017 A1 | 12/2021 | Kuo |
| 2021/0399846 A1 | 12/2021 | Kuo |
| 2022/0240317 A1* | 7/2022 | Dudda ............... H04W 74/0816 |
| 2022/0263743 A1* | 8/2022 | Gebert ................. H04W 76/15 |
| 2022/0264334 A1* | 8/2022 | Yang ................. H04W 72/0453 |
| 2022/0295480 A1* | 9/2022 | Xu ........................ H04W 72/23 |
| 2022/0321249 A1 | 10/2022 | Fu |
| 2022/0338218 A1 | 10/2022 | Hosseini |
| 2023/0088622 A1* | 3/2023 | Shimoda ............... H04W 68/02 455/458 |
| 2023/0171765 A1* | 6/2023 | Hong ................ H04W 72/1268 370/329 |

FOREIGN PATENT DOCUMENTS

| | | | |
|---|---|---|---|
| CN | 109802815 A | 5/2019 | |
| CN | 109905897 A | 6/2019 | |
| CN | 109952725 A | 6/2019 | |
| CN | 110445521 A | 11/2019 | |
| EP | 3554166 A1 | 10/2019 | |
| EP | 3783808 A1 | 2/2021 | |
| EP | 4084379 A1 | 11/2022 | |
| JP | 2020523898 A | 8/2020 | |
| KR | 20190098754 A | 8/2019 | |
| WO | WO-2019028759 A1 * | 2/2019 | ........... H04L 25/022 |
| WO | 2020089451 A1 | 5/2020 | |

OTHER PUBLICATIONS

International Search Report in the international application No. PCT/CN2020/112141, mailed on May 26, 2021—5 pages.
English translation of the Written Opinion of the International Search Authority in the international application No. PCT/CN2020/112141, mailed on May 26, 2021—8 pages.
3GPP TS 38.323 V16.1.0, "3rd Generation Partnership Project;Technical Specification Group Radio Access Network; NR; Packet Data Convergence Protocol (PDCP) specification (Release 16)", Technical Specification, (Jul. 2020)—40 pages.
Lenovo, Motorola Mobility, "Details of Selective Duplication Procedure", 3GPP TSG-RAN WG2 Meeting #107 R2-1910104, Prague, Czech Republic, Aug. 26-30, 2019—4 pages.
Lenovo, Motorola Mobility, "Details of Selective Duplication Procedure", 3GPP TSG0-RAN WG2 Meeting #106 R2-1906731, resubmission of R2-1904135, Reno, USA, May 13-17, 2019—4 pages.
Lenovo, Motorola Mobility, "Details of Selective Duplication Procedure", 3GPP TSG-RAN WG2 Meeting #105bis R2-1904135, Xi'an, China, Apr. 8-12, 2019—4 pages.
Samsung, "Introduction of NR IIOT", 3GPP TSG-RAN2 Meeting #109-e R2-2002341, Feb. 24-Mar. 6, 2020—18 pages.
CATT, "Survival time triggered PDCP duplication", 3GPP TSG-RAN WG2 Meeting #106 R2-1905752, revision of R2-1903142, Reno, USA, May 13-May 17, 2019—4 pages.
Nokia, Nokia Shanghai Bell, "Dynamic Adaptation of Uplink PDCP Duplication", 3GPP TSG-RAN WG2 Meeting #106 R2-1906190, Reno, NV, USA, May 13-17, 2019—4 pages.
Supplementary European Search Report in the European application No. 20950795.3, mailed on Jun. 15, 2023, 9 pages.
Office Action of the Indian application No. 202227076292, issued on Jul. 11, 2023, 6 pages with English translation.
Notice of Rejection of the Chinese application No. 202310222140.2, issued on Dec. 30, 2024, 14 pages with English translation.
First Office Action of the Korean application No. 10-2023-7001072, issued on Jul. 16, 2025.

* cited by examiner

The network device sends indication information to a terminal device, the indication information includes data transmission configuration information and validity period information, and the indication information is used for instructing the terminal device to perform data transmission within a validity period according to the data transmission configuration information

DATA TRANSMISSION METHOD, NETWORK DEVICE AND TERMINAL DEVICE

CROSS-REFERENCE TO RELATED APPLICATION

This is a continuation of International Application No. PCT/CN2020/112141 filed on Aug. 28, 2020, the disclosure of which is hereby incorporated by reference in its entirety.

BACKGROUND

In data transmission, a survival time is used for describing a duration between a time when the data transmission is failed and a time when the data transmission is recovered to be normal. The survival time may be represented as multiple data transfer intervals. In general, an activation condition for the survival time is a packet transmission failure. If a communication system fails to recover normal data transmission beyond the survival time, the communication service will enter a downtime state. When the survival time is activated, the method for reducing an error rate of data communication, such as data duplication transmission or the like, can be used to improve a success rate of the data transmission. For example, in the 5th Generation Mobile Communication New Radio (NR) Technology, a network device may activate and deactivate uplink duplication transmission of a terminal by sending a Media Access Control Control Element (MAC CE). However, the network device needs to send at least two MAC CEs to indicate activation and deactivation of the duplication transmission of the terminal. Such duplication activation transmission mechanism does not support the flexible change of duplication transmission state of the terminal, and thus it is necessary to optimize the design of this mechanism.

SUMMARY

In view of this, embodiments of the present disclosure relate to a field of communication, and provide a data transmission method, a network device and a terminal device.

An embodiment of the disclosure provides a data transmission method. The method may be applicable to a network device and include the following operations.

The network device sends indication information to a terminal device. The indication information includes data transmission configuration information and validity period information, and the indication information is used for instructing the terminal device to perform data transmission within a validity period according to the data transmission configuration information.

An embodiment of the disclosure provides a data transmission method. The method may be applicable to a terminal device and include the following operations.

The terminal device receives the indication information sent by the network device. The indication information includes data transmission configuration information and validity period information.

The terminal device performs data transmission within a validity period according to the data transmission configuration information.

An embodiment of the disclosure also provides a network device. The network device includes a sending module.

The sending module is configured to send indication information to a terminal device. The indication information includes data transmission configuration information and validity period information, and the indication information is used for instructing the terminal device to perform data transmission within a validity period according to the data transmission configuration information.

An embodiment of the disclosure also provides a terminal device. The terminal device includes a receiving module and a data transmission module.

The receiving module is configured to receive indication information sent by a network device. The indication information includes data transmission configuration information and validity period information.

The data transmission module is configured to perform data transmission within a validity period according to the data transmission configuration information.

An embodiment of the disclosure also provides a terminal device, including a processor and a memory for storing computer programs. The processor calls and runs the computer programs stored in the memory to perform the method described above.

An embodiment of the present disclosure also provides a network device including a processor and a memory for storing computer programs. The processor calls and runs the computer programs stored in the memory to perform the method described above.

An embodiment of the disclosure also provides a chip, including a processor. The processor is configured to call and run computer programs from a memory to enable the device installed with the chip to execute the methods described above.

An embodiment of the disclosure also provides a computer-readable storage medium for storing computer programs. The computer programs enable a computer to perform the methods described above.

An embodiment of the disclosure also provides a computer program product including a computer program instruction. The computer program instruction enables a computer to perform the methods described above.

An embodiment of the disclosure also provides a computer program. The computer program enables a computer to perform the methods described above.

According to the embodiments of the present disclosure, in a case where, for example, a data transmission failure occurs in the terminal device, the network device may send indication information to the terminal device, to instruct the terminal device to perform data transmission according to the indicated data transmission configuration information within a validity period, so that the terminal device may recover the uplink data transmission within a short duration according to the indication information. Therefore, the system downtime caused due to the prolonged data transmission failure can be avoid, and the implementation process is performed without multiple indications, but with a flexible indication mode, and the spectrum utilization rate is improved to a certain extent.

DETAILED DESCRIPTION

The technical solution in the embodiments of the application will be described below in conjunction with the drawings in the embodiments of the application.

The technical solutions of the embodiments of the present disclosure may be applied to various communication systems, for example, a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolution system of the NR system, an LTE-based access to unlicensed spectrum (LTE-U) system, a NR-based access to unlicensed spectrum (NR-U) system, a Non-Terrestrial Networks (NTN) system, a Universal Mobile Telecommunication System (UMTS), a Wireless Local Area Networks (WLAN), Wireless Fidelity (WiFi), a 5th-Generation (5G) system or other communication systems.

Generally speaking, conventional communication systems support a limited number of connections and are easy to implement. However, with the development of communication technology, mobile communication systems will not only support conventional communications, but also support communications, such as, Device to Device (D2D) communication, Machine to Machine (M2M) communication, Machine Type Communication (MTC), Vehicle to Vehicle (V2V) communication, or Vehicle to Everything (V2X) communication and the like. The embodiments of the present disclosure may also be applied to these communication systems.

In one example, the communication system in the embodiments of the present disclosure may be applied to a Carrier Aggregation (CA) scenario, a Dual Connectivity (DC) scenario, and a Standalone (SA) networking scenario.

The embodiments of the present disclosure describe each embodiment with reference to a network device and a terminal device. The terminal device may also be referred to as a User Equipment (UE), an access terminal, a subscriber unit, a subscriber station, a mobile station, a mobile platform, a remote station, a remote terminal, a mobile device, a user terminal, a terminal, a wireless communication device, a user agent or a user device and the like.

The terminal device may be a STAION (ST) in the WLAN, which may be a cellular phone, a cordless phone, a Session Initiation Protocol (SIP) phone, a Wireless Local Loop (WLL) station, a Personal Digital Assistant (PDA) device, a handheld device with a wireless communication function, a computing device or other processing device connected to a wireless modem, a vehicle-mounted device, a wearable device, and a terminal device in next generation communication systems, such as a terminal device in an NR network, a terminal device in a future evolved Public Land Mobile Network (PLMN) network or the like.

In the embodiments of the present disclosure, the terminal device may be deployed on land including indoors or outdoors, hand-held, wearable or vehicle-mounted, may be deployed on the water (such as in a ship), and may also be deployed in the air (such as in an airplane, balloon and satellite).

In the embodiments of the present disclosure, the terminal device may be a Mobile Phone, a Pad, a computer with a wireless transceiver function, a virtual reality (VR) terminal device, an Augmented Reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city or smart home, or the like.

It is exemplary but unlimited that, in the embodiments of the present disclosure, the terminal device may also be a wearable device. The wearable device may also be called a wearable intelligent device, which is generic term of a wearable device developed by applying wearable technology to intelligently design daily wear, such as glasses, gloves, watches, clothing and shoes. The wearable device is a portable device that is worn on the body directly or integrated into user's clothes or accessories. The wearable device is not only a hardware device, but also a powerful function realized through software support, data interaction and cloud interaction. A generalized wearable intelligent device includes full-featured, large size and complete or partial functions realized without relying on smart phones, such as smart watches or smart glasses, and includes only a certain application function, which is necessary to be used in conjunction with other devices such as a smart phone, such as various smart bracelets for monitoring physical signs, or smart jewelry and the like.

In the embodiments of the present disclosure, the network device may be a device communicating with a mobile device. The network device may be an Access Point (AP) in the WLAN, a Base Transceiver Station (BTS) in the GSM or the CDMA, a NodeB (NB) in the WCDMA, an Evolved Node B (eNB or eNodeB) in the LTE, a relay station or an access point, a vehicle-mounted device, a wearable device, a network device in a NR network (gNB), a network device in the future evolved PLMN network or the like.

It is exemplary but unlimited that, in the embodiments of the present disclosure, the network device may have mobility characteristics, for example, the network device may be a mobile device. In one example, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, and the like. In one example, the network device may also be a base station arranged on land, water and the like.

In the embodiments of the present disclosure, the network device provides services for a cell, and the terminal device communicates with the network device through transmission resources used by the cell (such as, frequency domain resources or spectrum resources). The cell may be a cell corresponding to the network device (such as, a base station), and the cell may belong to a macro base station or a base station corresponding to a small cell. The small cell here may include a metro cell, a micro cell, a pico cell, or a femto cell and the like. These small cells have characteristics of small coverage and low transmission power, which are suitable for providing high-speed data transmission services.

Figure 1:
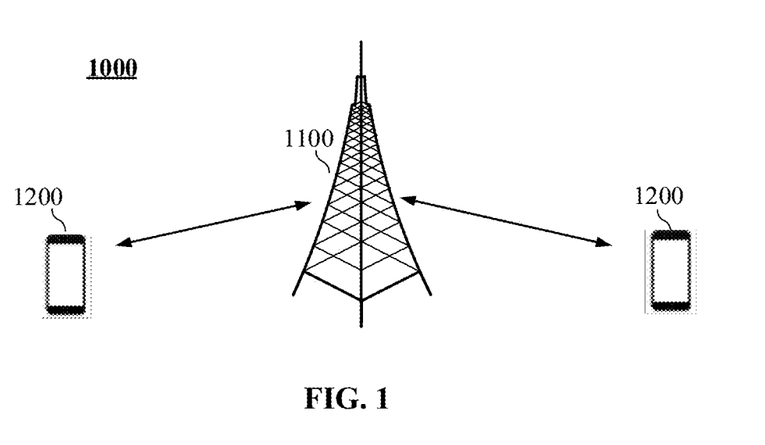
FIG. 1 is a schematic diagram of a communication system architecture according to an embodiment of the present disclosure.

FIG. 1 schematically illustrates one network device 1100 and two terminal devices 1200. In one example, the wireless communication system 1000 may include multiple network devices 1100, and other numbers of terminal devices may be included within the coverage area of each network device 1100, which is not limited by the embodiments of the present disclosure. In one example, the wireless communication system 1000 illustrated in FIG. 1 may also include other network entities, such as a Mobility Management Entity (MME), an Access and Mobility Management Function (AMF), which is not limited by the embodiments of the present disclosure.

It is to be understood that terms "system" and "network" in the disclosure may usually be exchanged in the disclosure. In the disclosure, term "and/or" is only an association relationship describing associated objects, for example, represents that previous and next associated objects may have three relationships. For example, A and/or B may represent three conditions: i.e., independent existence of A, existence of both A and B, and independent existence of B. The character "/" in the disclosure usually represents that previous and next associated objects form an "or" relationship. In the description of embodiments of the present disclosure, the term "correspondence" may indicate a direct or indirect correspondence between the two elements, or may indicate an association between the two elements, or may indicate a relationship of indicating and being indicated, configuring and being configured, etc.

In order to clearly illustrate the ideas of the embodiments of the present disclosure, a process that the network activates Radio Link Control (RLC) for duplication transmissions in a communication system is described in brief firstly.

Figure 2:
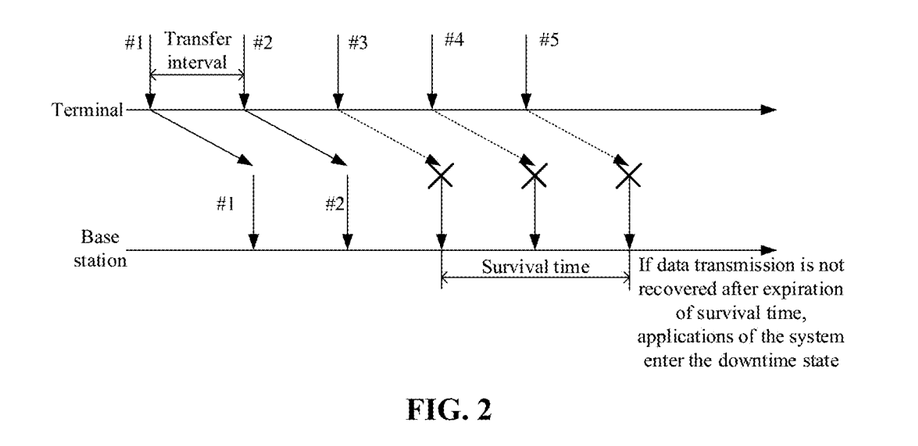
FIG. 2 is a schematic diagram of a system downtime caused due to timeout of uplink data transmission failure of a terminal device.
Figure 3:
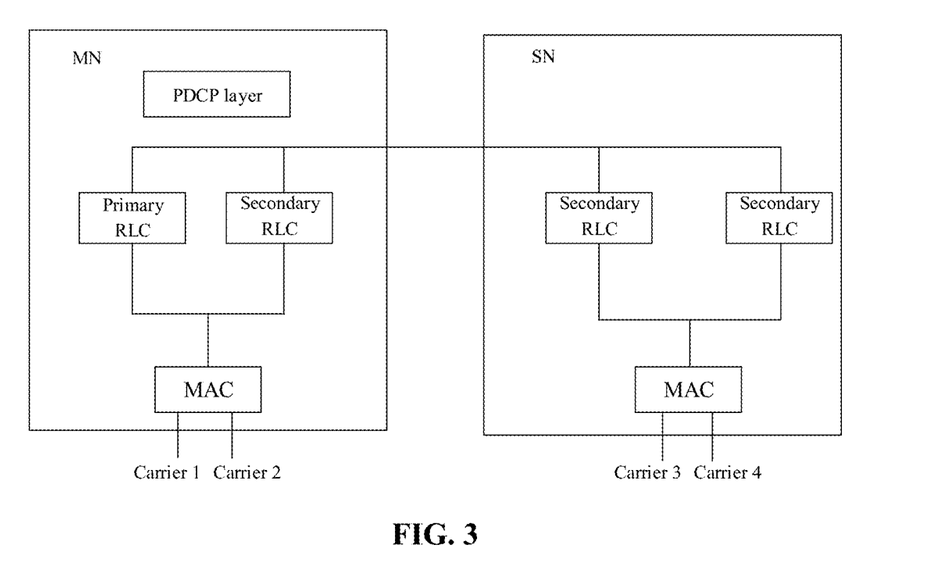
FIG. 3 is a schematic diagram of a multi-link data duplication transmission system required to be activated/deactivated.
Figure 4:
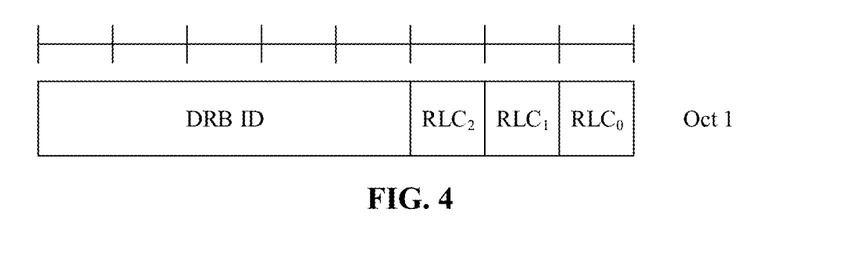
FIG. 4 is a schematic diagram of a format of an MAC CE for the activation/deactivation for the embodiment of FIG. 3.

FIG. 2 illustrates a schematic diagram of a system downtime due to an expiration of the survival time. The survival time is two transfer intervals, and an activation condition is a packet transmission failure. If the data transmission is not recovered before expiration of the survival time, applications of the system (such as industrial control and other field applications) enter the downtime state. At present, a scheme of data duplication on more than two transmission links has been introduced to improve reliability of the data transmission. The network activates an uplink duplication transmission of the terminal by sending a Radio Resource Control (RRC) signaling or a MAC CE, with reference to FIG. 3, one primary RLC link is always active and it is determined based on the network configuration whether other secondary RLC links are activated. The network indicates the specific secondary RLC link to be activated for duplication transmission through the MAC CE illustrated in FIG. 4. In FIG. 4, RLC2, RLC1 and RLC0 correspond to RLC links with logical channel numbers arranged in ascending order or in descending order, respectively, and each bit corresponding a respective one of RLC2, RLC1 and RLC0 is set to 1 or 0, which represents that the duplication transmission of the RLC link is activated or deactivated.

Based on the MAC CE illustrated in FIG. 4, the network needs to send at least two MAC CEs to complete activation and deactivation of the duplication transmission of the terminal. For the activation of the terminal duplication transmission state, especially for the scenario of meeting a survival time transmission guarantee, the existing duplication transmission activation mechanism is not flexible enough.

Figure 5:
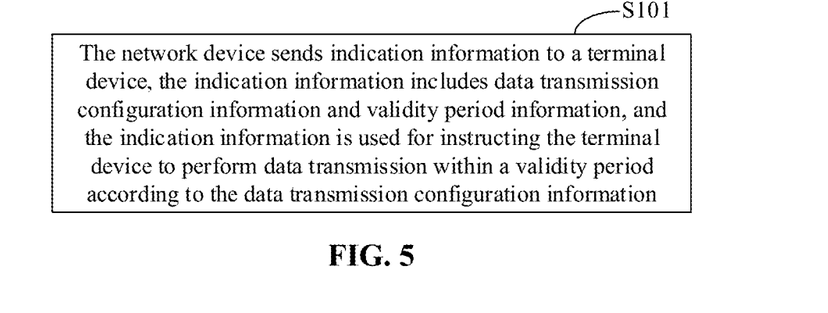
FIG. 5 is a flowchart of a data transmission method of a network side embodiment of the present disclosure.

The embodiments of the present disclosure provide a data transmission method applicable to a network device. With reference to FIG. 5, the method includes the following operation.

In S101, the network device sends indication information to a terminal device. The indication information includes data transmission configuration information and validity period information, and the indication information is used for instructing the terminal device to perform data transmission within a validity period according to the data transmission configuration information.

According to the embodiments of the present disclosure, the network device sends the indication information to the terminal device, for example, in a case where the terminal device fails to transmit a packet, the network device sends the indication information including the data transmission configuration information and the validity period information to the terminal device, to instruct the terminal device to perform data transmission within the validity period according to the data transmission configuration information. After the terminal device receives the indication information, the terminal device may enable the uplink data transmission and recover the data transmission before the expiration of the survival time, thus avoiding system downtime and facilitating to meet the requirements of transmission guarantee.

Figure 6:
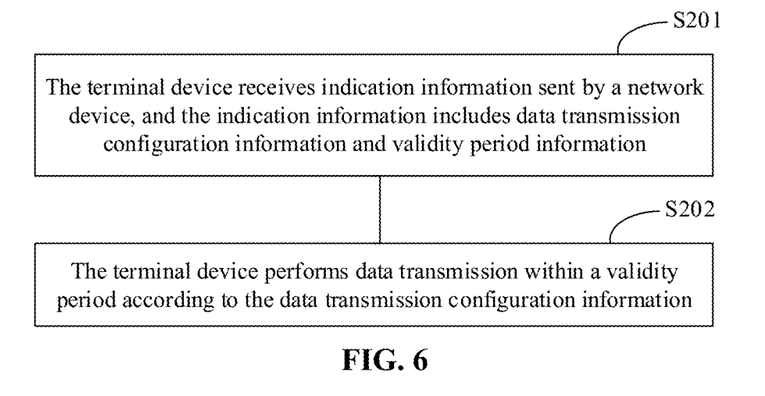
FIG. 6 is a flowchart of a data transmission method of a terminal side embodiment of the present disclosure.

Correspondingly, the embodiments of the present disclosure provide a data transmission method applicable to a terminal device. With reference to FIG. 6, the method includes the following operations.

In S201, the terminal device receives indication information sent by a network device. The indication information includes data transmission configuration information and validity period information.

In S202, the terminal device performs data transmission within a validity period according to the data transmission configuration information.

According to the embodiments of the present disclosure, the terminal device enables the uplink data transmission after receiving the indication information, and performs the data transmission within the validity period based on the indicated data transmission configuration information, so that the system recovers the data transmission before the expiration of the survival time, and there is no need to receive a deactivation indication again in the implementation process, thus improving the spectrum utilization rate.

In the embodiments of the present disclosure, the data transmission configuration information may include at least one of duplication transmission activation information, logical channel configuration change information, or transmission parameter information.

a) The duplication transmission activation information is used for the terminal device to activate a duplication transmission process.

b) The logical channel configuration change information is used for changing logical channel configuration corresponding to an uplink data transmission of the terminal device.

c) The transmission parameter information is used for the terminal device to perform data transmission using the corresponding transmission parameters.

In an embodiment of the present disclosure, the terminal device may also perform at least one of the following operations a) to c).

a) The terminal device activates the duplication transmission process according to the duplication transmission activation information.

b) The terminal device changes the logical channel configuration corresponding to the uplink data transmission of the terminal device according to the logical channel configuration change information.

c) The terminal device performs data transmission by using the transmission parameters corresponding to the transmission parameter information.

In an embodiment of the present disclosure, after the expiration of the validity period, the terminal device may also perform at least one of the following operations a) to c).

a) The terminal device stops the duplication transmission.

b) The terminal device recovers to perform the uplink data transmission according to a logical channel configuration used before receiving the logical channel configuration change information.

c) The terminal device recovers to perform the data transmission according to one or more transmission parameters used before receiving the transmission parameter information.

According to an embodiment of the present disclosure, the duplication transmission activation information may include at least one of the following:

index information of one or more secondary Radio Link Controls (RLCs) for data duplication transmission;

configuration state information of the one or more secondary RLCs for the data duplication transmission; or indication information used for activating the duplication transmission.

According to an embodiment of the present disclosure, the logical channel configuration change information may include at least one of the following:

a logical channel for the terminal device to perform uplink data transmission, where different logical channels correspond to different cells; or cell identification information corresponding to an allowed serving cell used for the terminal device to perform the uplink data transmission.

According to an embodiment of the present disclosure, the transmission parameter information may include index information of a modulation and coding scheme (MCS).

According to an embodiment of the present disclosure, the validity period information includes at least one of: a duration, a start time, an end time, a number of times that a packet is transmitted according to the data transmission configuration information, a condition for enabling or activating the data transmission according to the data transmission configuration information, or a condition for disabling or deactivating the data transmission according to the data transmission configuration information.

According to an embodiment of the present disclosure, the condition for enabling or activating the data transmission according to the data transmission configuration information includes at least one of the following:

a process number of Hybrid Automatic Repeat reQuest (HARQ) corresponding to a next data transmission performed according to the data transmission configuration information; or a difference between the process number of the HARQ corresponding to the next data transmission performed according to the data transmission configuration information and a process number of a HARQ corresponding to a previous data transmission in which the packet was not successfully received.

According to an embodiment of the present disclosure, the condition for disabling or deactivating the data transmission according to the data transmission configuration information includes at least one of the following.

The number of times of the data transmission performed according to the data transmission configuration information is greater than or equal to a first threshold before an acknowledgement (ACK) message is received.

The number of received ACK messages is greater than or equal to a second threshold.

A reference signal measurement is greater than or equal to a third threshold.

In the embodiments of the present disclosure, various thresholds may be preset or set by a network.

In an embodiment of the present disclosure, the data transmission configuration information may be carried by at least one of: MAC CE, RRC, or Downlink Control Information (DCI). In one example, the validity period information may be carried by at least one of: MAC CE, RRC or DCI.

At least one embodiment of the present disclosure described above supports the network to enable the terminal to activate duplication transmission within a short period of time, which not only meets the requirement of survival time for the packet transmission failure time not to be long, but also improves the spectrum utilization rate.

Various implementations of the embodiments of the present disclosure have been described above and the implementation processes of the embodiments of the present disclosure are described below in combination with specific examples.

On the network device side, the network device, such as a base station, sends the indication information to the terminal via MAC CE, RRC signaling or DCI, and the indication information includes the data transmission configuration information and the validity period information. The data transmission configuration information may include duplication transmission activation information, may include logical channel configuration change information, and may also include other transmission parameter information such as MCS information.

In different implementations, the data transmission configuration information may include any one of the above three types of information, a combination of any two types of the information, or all three types of the information.

For example, in an implementation of the present disclosure, the data transmission configuration information includes the duplication transmission activation information and the logical channel configuration change information. After the terminal device receives the indication information, the terminal device will perform a duplication transmission process of the packet in the logical channel corresponding to the logical channel configuration change information within the validity period.

In another implementation, the data transmission configuration information includes the duplication transmission activation information and first MCS index information.

After the terminal device receives the indication information, the terminal device will perform the duplication transmission process of the packet within the validity period using one or more transmission parameters corresponding to the first MCS index information.

Furthermore, the indication information further includes the validity period information. The validity period information may be configurable, for example, the validity period may be configured by the RRC or the validity period information may be carried by the MAC CE.

In one example, the validity period may be the number of packet transmissions (for example, N transmissions), and the validity period ends when the N packets are transmitted. The validity period may also be defined using a timer, and the validity period ends when the timer expires.

In different implementations of the present disclosure, the indication information sent from the base station to the terminal may carry multiple types of information, and the cases where the indication information carries multiple types of the information and the corresponding processing on the terminal side are listed below.

1) The indication information carries information related to a duration of data transmission and/or a duration of continuous duplication data transmission performed according to the data transmission configuration information (which may include duplication transmission activation information, logical channel configuration change information and/or other transmission parameter information). The terminal device performs data transmission within the duration according to the data transmission configuration information, and automatically recovers to perform data transmission according to the original configuration of the system after the duration expires.

2) The indication information carries information related to the number of times of data transmission and/or continuous duplication data transmission performed according to the data transmission configuration information. The terminal device will perform the duplication transmission of the packet according to the data transmission configuration information, and after the duplication transmission is performed for the number of times (for example, the same packet is repeatedly transmitted for 10 times), the terminal device will automatically recovers to perform the data transmission according to the original configuration of the system.

3) The indication information carries a condition for stopping data transmission and/or continuous duplication data transmission performed according to the data transmission configuration information. For example, after the terminal receives N ACK information (N is a threshold and N is a positive integer), or after the measurement of the reference signal, such as Reference Signal Receiving Power (RSRP) of the terminal is higher than a threshold, the terminal no longer performs data transmission and/or continuous duplication data transmission according to the data transmission configuration information, but recovers to perform the data transmission according to the original configuration of the system.

4) The indication information carries information related to a start time of the data transmission and/or continuous duplication data transmission performed according performed according to the data transmission configuration information, for example, a process number of HARQ to be used in the future for carrying data, or a difference between the process number of the HARQ to be used in the future for carrying data and a process number of HARQ corresponding a previous data transmission in which the packet was not successfully received. The terminal device performs, through the HARQ process corresponding to the HARQ process number, the data transmission according to the data transmission configuration information.

5) The indication information carries indexes of secondary RLCs for the data duplication transmission. In one example, the default setting may be the indexes of all the secondary RLCs, i.e., if the indication information includes no index information of the secondary RLC, the terminal device defaults to use all the secondary RLCs to perform the duplication transmission of the packet.

6) The indication information carries configuration state information of the secondary RLCs for the data duplication transmission, for example, the following configuration may be made in RRC: RLC1 and RLC2 are configured as a set numbered 0; RLC2 and RLC3 are configured as a set numbered 1, and so on. Then the terminal may use a set of secondary RLCs corresponding to a received number to perform the duplication transmission of the packet.

7) The indication information carries an indicator used for activating duplication transmission, where other configurations, such as data transmission configuration information and validity period information, have been configured in RRC signaling. Then the terminal device starts to perform data transmission according to the data transmission configuration information when the terminal device receives the indicator used for activating the duplication transmission.

8) The indication information carries a time point or an effective time for data transmission performed according to the data transmission configuration information. When the time point or the effective time is reached, for example, when the uplink data transmission of the terminal fails, the terminal device will start the data transmission according to the data transmission configuration information.

9) The indication information carries information related to a recommend logical channel used for the terminal to perform the uplink data transmission, where different logical channels correspond to different cells, the indication information carries information related to a modified allowed serving cell suitable for the terminal to perform the uplink data transmission, such as cell ID identification information in the modified allowed serving cell. The terminal device will perform the data transmission through the recommended logical channel.

10) The indication information carries index number information of a modified MCS. The terminal device will enable the modified MCS to perform the data transmission.

11) The indication information carries a number of received ACK messages. After the number of the received ACK messages is greater than or equal to the number, the terminal no longer performs data transmission and/or continuous duplication data transmission according to the data transmission configuration information, but recovers to perform the data transmission according to the original configuration of the system.

12) The indication information carries the number of the repeated packet transmissions before HARQ feedback of the ACK message is received. After the number of the packet transmissions before the ACK is received is greater than or equal to the number of the repeated packet transmissions, the terminal no longer performs the data transmission and/or continuous duplication data transmission according to the data transmission configuration information, but recovers to perform the data transmission according to the original configuration of the system.

Figure 7:
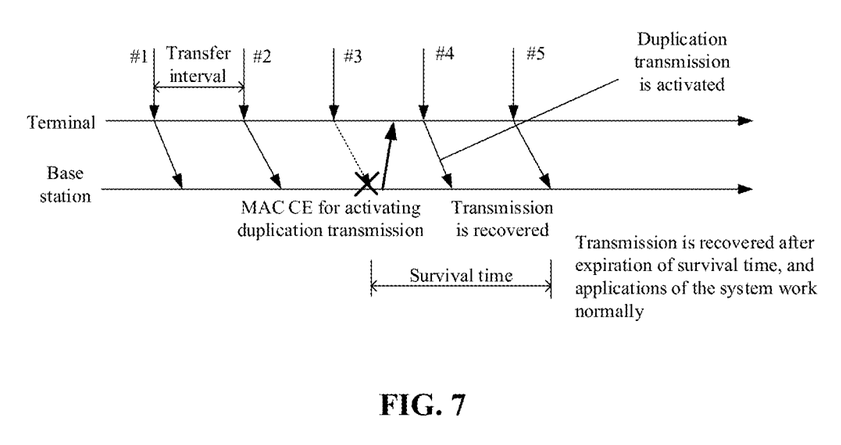
FIG. 7 is a schematic diagram of activating data duplication transmission of a terminal device according to an embodiment of the present disclosure.

It can be seen, when the terminal receives the indication information from the base station, the terminal starts the data transmission according to the relevant configuration of the indication information, such as the duplication transmission of the packet. In one example, when the corresponding stop condition is met, the terminal will automatically stop the duplication transmission. As illustrated in FIG. 7, when the uplink data transmission of the terminal fails, the base station sends the indication information to the terminal, and the indication information is carried by the MAC CE. After the terminal receives the indication information, the terminal enables or activates the duplication transmission, and recovers the transmission before the expiration of the survival time, without the need to send the MAC CE for deactivating the duplication transmission again, thereby meeting the requirements of survival time transmission guarantee.

At least one embodiment of the present disclosure supports the network to enable the terminal to activate the duplication transmission within a short period of time by setting the data transmission configuration information and corresponding validity period information for the terminal, which not only meets the requirement of survival time for the packet transmission failure time not to be long, but also improves the spectrum utilization rate.

Figure 8:
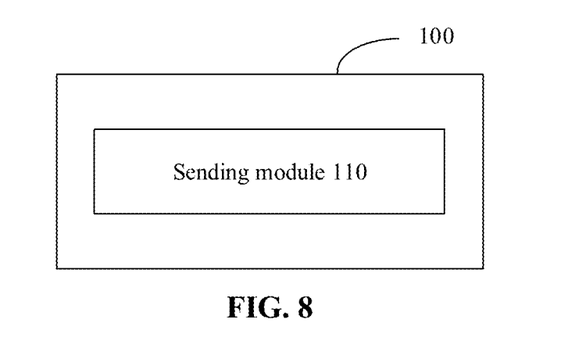
FIG. 8 is a schematic structural diagram of a network device according to an embodiment of the present disclosure.

The specific arrangements and implementations of the embodiments of the present disclosure have been described from different angles through multiple embodiments. Corresponding to the processing method of at least one embodiment described above, the embodiments of the present disclosure also provide a network device 100. With reference to FIG. 8, the network device 100 includes a sending module 110.

The sending module 110 is configured to send indication information to a terminal device. The indication information includes data transmission configuration information and validity period information, and the indication information is used for instructing the terminal device to perform data transmission within a validity period according to the data transmission configuration information.

Figure 9:
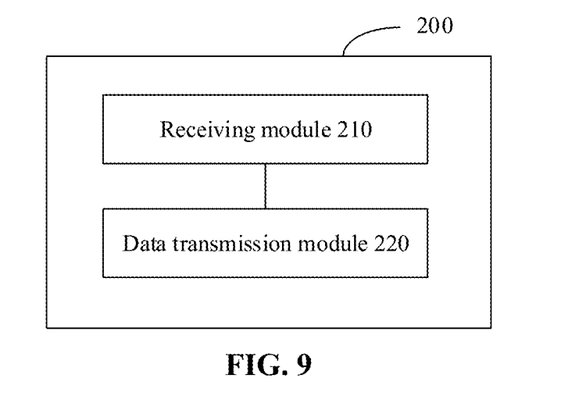
FIG. 9 is a schematic structural diagram of a terminal device according to an embodiment of the present disclosure.

Corresponding to the processing method of at least one embodiment described above, the embodiments of the present disclosure also provide a terminal device 200. With reference to FIG. 9, the terminal device 200 includes a receiving module 210 and a data transmission module 220.

The receiving module 210 is configured to receive indication information sent by a network device. The indication information includes data transmission configuration information and validity period information.

The data transmission module 220 is configured to perform data transmission according to the data transmission configuration information within a validity period.

The network device 100 and the terminal device 200 in the embodiments of the present disclosure can implement the corresponding functions of the network device and the terminal device in the aforementioned method embodiments, respectively. The flow, function, implementation and beneficial effect corresponding to each module (sub-module, unit or component, etc.) in the network device 100 and the terminal device 200 can be referred to the corresponding description in the above method embodiments, and will not be described herein.

It is to be noted that, the functions described with respect to each module (sub-modules, units or components, etc.) in the network device 100 and the terminal device 200 of the embodiments of the present disclosure may be implemented by different modules (sub-module, unit or component, etc.) or by the same module (sub-module, unit or component, etc.). For example, the receiving module and the data transmission module may be different modules or the same module, which all can implement the corresponding functions of the terminal device according to the embodiments of the present disclosure.

Figure 10:
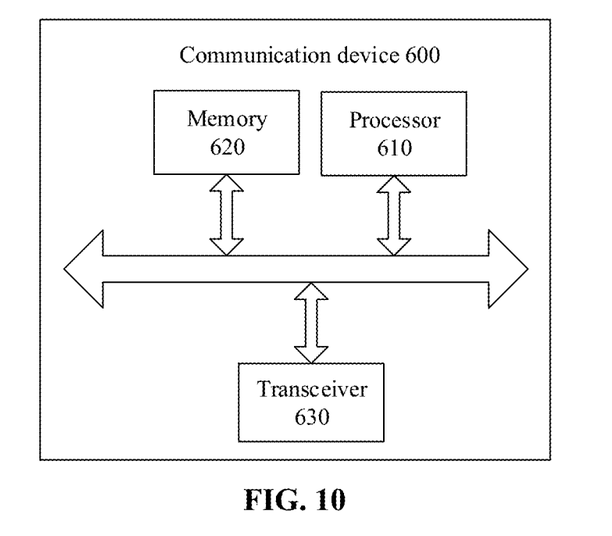
FIG. 10 is a schematic diagram of a communication device according to an embodiment of the present disclosure.

FIG. 10 is a schematic structural diagram of a communication device 600 according to an embodiment of the present disclosure. The communication device 600 includes a processor 610. The processor 610 may call and run computer programs from a memory to implement the method in the embodiments of the present disclosure.

In one example, the communication device 600 may also include a memory 620. The processor 610 may call and run computer programs from the memory 620 to implement the method in the embodiments of the present disclosure.

The memory 620 may be a separate device independent of the processor 610 or may be integrated in the processor 610.

In one example, the communication device 600 may also include a transceiver 630. The processor 610 may control the transceiver 630 to communicate with other devices and specifically, may send information or data to other devices or receive information or data from other devices.

The transceiver 630 may include a transmitter and a receiver. The transceiver 630 may further include an antenna (s), and the number of which may be one or more.

In one example, the communication device 600 may be a network device of the embodiments of the present disclosure, and the communication device 600 may implement corresponding flows implemented by the network device in each method of the embodiments of the present disclosure, which will not be elaborated herein for brevity.

In one example, the communication device 600 may be the terminal device in the embodiments of the present disclosure, and the communication device 600 may implement corresponding flows implemented by the terminal device in each method of the embodiments of the present disclosure, which will not be elaborated herein for brevity.

Figure 11:
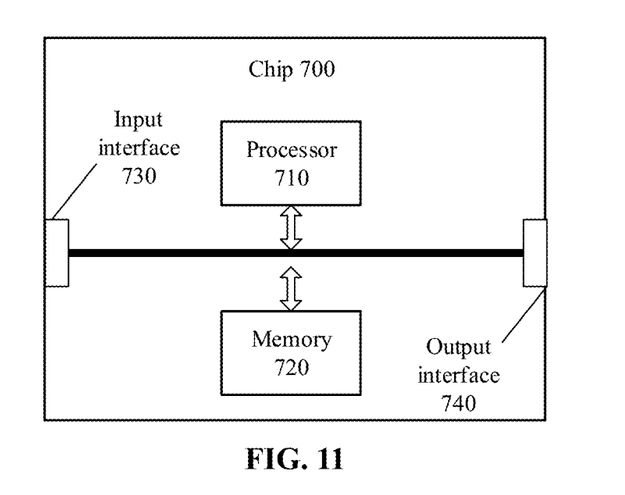
FIG. 11 is a schematic diagram of a chip according to an embodiment of the present disclosure.

FIG. 11 is a schematic structural diagram of a chip according to an embodiment of the present disclosure. The chip 700 includes a processor 710, and the processor 710 may call and run computer programs from a memory to implement the method in the embodiments of the disclosure.

In one example, the chip 700 may also include a memory 720. The processor 710 may call and run the computer programs from the memory 720 to implement the method in the embodiments of the disclosure.

The memory 720 may be a separate device independent of or integrated into the processor 710.

In one example, the chip 700 may also include an input interface 730. The processor 710 may control the input interface 730 to communicate with the other device or chip, specifically to acquire information or data from the other device or chip.

In one example, the chip 700 may also include an output interface 740. The processor 710 may control the output interface 740 to communicate with the other device or chip, specifically to output information or data to the other device or chip.

In one example, the chip may be applied to the network device in the embodiments of the present disclosure, and the chip may implement corresponding flows implemented by the network device in each method of the embodiments of the present disclosure, which will not be elaborated herein for brevity.

In one example, the chip may be applied to the terminal device in the embodiments of the present disclosure, and the chip may implement corresponding flows implemented by the terminal device in each method of the embodiments of the present disclosure, which will not be elaborated herein for brevity.

It is to be understood that the chips mentioned in the embodiments of the present disclosure may also be referred to as system level chips, system chips, chip systems or on-chip system chips, etc.

The above processors may be general purpose processors, Digital Signal Processors (DSPSs), Application Specific Integrated Circuits (ASICs), Field Programmable Gate Arrays (FPGAs) or other programmable logic devices, discrete gate or transistor logic devices, and discrete hardware components. The general-purpose processor may be a microprocessor or any conventional processor or the like.

The memory mentioned above may be a volatile memory or a non-volatile memory or may include both the volatile memory and the non-volatile memory. The non-volatile memory may be Read-only Memory (ROM), Programmable ROM (PROM), Erasable programmable ROM (EPROM), Electrically Erasable ROM (EPROM) or flash memory. The volatile memory may be a Random Access Memory (RAM).

It is to be understood that the above memory is exemplary but not restrictive. For example, the memory in the embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synch Link DRAM (SLDRAM), Direct Rambus RAM (DR RAM), etc. That is to say, the memory in the embodiments of the present disclosure is intended to include, but not limited to, these and any other suitable types of memory.

Figure 12:
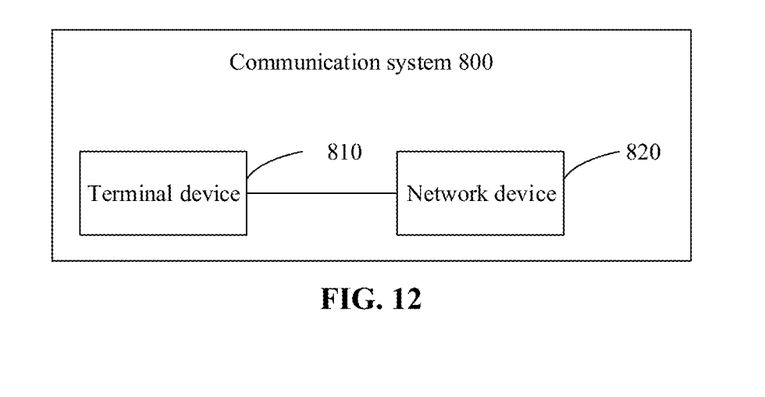
FIG. 12 is a schematic diagram of a communication system according to an embodiment of the present disclosure.

FIG. 12 is a schematic diagram of a communication system 800 according to an embodiment of the present disclosure. The communication system 800 includes a terminal device 810 and a network device 820.

The terminal device 810 may be configured to implement corresponding functions implemented by the terminal device in the methods of various embodiments of the present disclosure, and the network device 820 may be configured to implement corresponding functions implemented by the network device in the methods of various embodiments of the present disclosure. For the sake of brevity, it will not be elaborated herein.

The foregoing embodiments may be implemented in whole or in part by software, hardware, firmware, or any combination thereof. When implemented by software, it may be implemented in whole or in part in the form of a computer program product. The computer program product includes one or more computer instructions. When the computer program instructions are loaded and executed on a computer, all or part of the processes or functions according to the embodiments of the present disclosure are generated. The computer may be a general-purpose computer, a special-purpose computer, a computer network, or other programmable devices. The computer instructions may be stored in a computer-readable storage medium or transmitted by means of the computer-readable storage medium. The computer instructions may be transmitted from a web site site, computer, server, or data center to another web site site, computer, server, or data center in a wired (such as a coaxial cable, an optical fiber, and a Digital Subscriber Line (DSL)) or wireless (such as infrared, wireless, and microwave) manner. The computer-readable storage medium may be any available medium that may be accessed by a computer or a data storage device such as a server including one or more available medium integrations and a data center. The available medium may be a magnetic medium (such as a floppy disk, a hard disk, and a magnetic tape), an optical medium (such as a Digital Versatile Disc (DVD)), a semiconductor medium (such as a Solid State Disk (SSD)), or the like.

It should be understood that, in various embodiments of the present disclosure, a magnitude of a sequence number of each process does not mean an execution sequence and the execution sequence of each process should be determined by its function and an internal logic and should not form any limit to an implementation process of the embodiments of the disclosure.

Those skilled in the art may clearly learn about that specific working processes of the system, device and unit described above may refer to the corresponding processes in the method embodiments and will not be elaborated herein for convenient and brief description.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A data transmission method, applicable to a terminal device, comprising:
    receiving, by the terminal device, indication information sent by a network device, wherein the indication information comprises data transmission configuration information and validity period information; and
    performing, by the terminal device, data transmission within a validity period according to the data transmission configuration information;
    wherein the data transmission configuration information comprises at least one of: logical channel configuration change information; and the method further comprises
    changing, by the terminal device according to the logical channel configuration change information, a logical channel configuration corresponding to an uplink data transmission of the terminal device;
    wherein the validity period information comprises a condition for enabling or activating the data transmission according to the data transmission configuration information, and/or a condition for disabling or deactivating the data transmission according to the data transmission configuration information;
    the condition for enabling or activating the data transmission according to the data transmission configuration information comprises at least one of:
    a process number of Hybrid Automatic Repeat reQuest (HARQ) corresponding to a next data transmission performed according to the data transmission configuration information; or
    a difference between the process number of the HARQ corresponding to the next data transmission performed according to the data transmission configuration information and a process number of HARQ corresponding a previous data transmission in which the packet was not successfully received;

the condition for disabling or deactivating the data transmission according to the data transmission configuration information comprises at least one of:

a number of times of the data transmission according to the data transmission configuration information being greater than or equal to a first threshold before an acknowledgement (ACK) message is received; or a number of received ACK messages being greater than or equal to a second threshold.

2. The method of claim 1, wherein the data transmission configuration information further comprises at least one of duplication transmission activation information, or transmission parameter information; and the method further comprises at least one of:

activating, by the terminal device, a duplication transmission process according to the duplication transmission activation information; or, performing, by the terminal device, the data transmission using a transmission parameter corresponding to the transmission parameter information.

3. The method of claim 2, wherein after an expiration of the validity period, the method further comprises at least one of:

stopping, by the terminal device, duplication transmission;

recovering, by the terminal device, to perform the uplink data transmission according to a logical channel configuration used before receiving the logical channel configuration change information; or, recovering, by the terminal device, to perform the data transmission according to a transmission parameter used before receiving the transmission parameter information.

4. The method of claim 2, wherein the duplication transmission activation information comprises at least one of:

index information of one or more secondary Radio Link Controls (RLCs) for data duplication transmission;

configuration state information of the one or more secondary RLCs for the data duplication transmission; or indication information used for activating duplication transmission.

5. The method of claim 1, wherein the logical channel configuration change information comprises at least one of:

a logical channel for the terminal device to perform an uplink data transmission, wherein different logical channels correspond to different cells; or cell identification information corresponding to an allowed serving cell used for the terminal device to perform the uplink data transmission.

6. The method of claim 1, wherein the validity period information comprises at least one of:

a duration, a start time, an end time, a number of times that a packet is transmitted according to the data transmission configuration information.

7. The method of claim 1, wherein the condition for disabling or deactivating the data transmission according to the data transmission configuration information further comprises a reference signal measurement being greater than or equal to a third threshold.

8. A terminal device, comprising a processor and a transceiver, wherein the processor is configured to control the transceiver to:

receive indication information sent by a network device, wherein the indication information comprises data transmission configuration information and validity period information; and perform data transmission within a validity period according to the data transmission configuration information;

wherein the data transmission configuration information comprises logical channel configuration change information; and the processor is configured to:

change, according to the logical channel configuration change information, a logical channel configuration corresponding to an uplink data transmission of the terminal device;

wherein the validity period information comprises a condition for enabling or activating the data transmission according to the data transmission configuration information, and/or a condition for disabling or deactivating the data transmission according to the data transmission configuration information;

the condition for enabling or activating the data transmission according to the data transmission configuration information comprises at least one of:

a process number of Hybrid Automatic Repeat reQuest (HARQ) corresponding to a next data transmission performed according to the data transmission configuration information; or a difference between the process number of the HARQ corresponding to the next data transmission performed according to the data transmission configuration information and a process number of HARQ corresponding a previous data transmission in which the packet was not successfully received;

the condition for disabling or deactivating the data transmission according to the data transmission configuration information comprises at least one of:

a number of times of the data transmission according to the data transmission configuration information being greater than or equal to a first threshold before an acknowledgement (ACK) message is received; or a number of received ACK messages being greater than or equal to a second threshold.

9. The terminal device of claim 8, wherein the data transmission configuration information further at least one of comprises duplication transmission activation information, or transmission parameter information; and the processor is configured to perform at least one of:

activating a duplication transmission process according to the duplication transmission activation information; or, performing the data transmission using a transmission parameter corresponding to the transmission parameter information.

10. The terminal device of claim 9, wherein the duplication transmission activation information comprises at least one of:

index information of one or more secondary Radio Link Controls (RLCs) for data duplication transmission;

configuration state information of the one or more secondary RLCs for the data duplication transmission; or indication information used for activating duplication transmission.

11. The terminal device of claim 8, wherein the logical channel configuration change information comprises at least one of:

a logical channel for the terminal device to perform an uplink data transmission, wherein different logical channels correspond to different cells; or cell identification information corresponding to an allowed serving cell used for the terminal device to perform the uplink data transmission.

12. The terminal device of claim 8, wherein the validity period information comprises at least one of:
a duration, a start time, an end time, a number of times that a packet is transmitted according to the data transmission configuration information.

13. The method of claim 8, wherein the condition for disabling or deactivating the data transmission according to the data transmission configuration information further comprises
a reference signal measurement being greater than or equal to a third threshold.

14. A network device, comprising:
a transceiver, configured to send indication information to a terminal device, wherein the indication information comprises data transmission configuration information and validity period information, and the indication information is used for instructing the terminal device to perform data transmission within a validity period according to the data transmission configuration information;
wherein the data transmission configuration information comprises logical channel configuration change information,
the logical channel configuration change information is used for changing logical channel configuration corresponding to an uplink data transmission of the terminal device;
wherein the validity period information comprises a condition for enabling or activating the data transmission according to the data transmission configuration information, and/or a condition for disabling or deactivating the data transmission according to the data transmission configuration information;
the condition for enabling or activating the data transmission according to the data transmission configuration information comprises at least one of:
a process number of Hybrid Automatic Repeat reQuest (HARQ) corresponding to a next data transmission performed according to the data transmission configuration information; or
a difference between the process number of the HARQ corresponding to the next data transmission performed according to the data transmission configuration information and a process number of HARQ corresponding a previous data transmission in which the packet was not successfully received;
the condition for disabling or deactivating the data transmission according to the data transmission configuration information comprises at least one of:
a number of times of the data transmission according to the data transmission configuration information being greater than or equal to a first threshold before an acknowledgement (ACK) message is received; or
a number of received ACK messages being greater than or equal to a second threshold.

15. The network device of claim 14, wherein the data transmission configuration information further comprises at least one of duplication transmission activation information, or transmission parameter information,
wherein the duplication transmission activation information is used for the terminal device to activate a duplication transmission process; and
the transmission parameter information is used for the terminal device to perform the data transmission using a transmission parameter corresponding to the transmission parameter information.

16. The network device of claim 15, wherein the duplication transmission activation information comprises at least one of:
index information of one or more secondary Radio Link Controls (RLCs) for data duplication transmission;
configuration state information of the one or more secondary RLCs for the data duplication transmission; or
indication information used for activating duplication transmission.

17. The network device of claim 14, wherein the logical channel configuration change information comprises at least one of:
a logical channel for the terminal device to perform an uplink data transmission, wherein different logical channels correspond to different cells; or
cell identification information corresponding to an allowed serving cell used for the terminal device to perform the uplink data transmission.

18. The network device of claim 14, wherein the validity period information comprises at least one of:
a duration, a start time, an end time, a number of times that a packet is transmitted according to the data transmission configuration information.

* * * * *